(12) United States Patent
Dower et al.

(10) Patent No.: US 7,531,748 B2
(45) Date of Patent: *May 12, 2009

(54) SEALING APPARATUS

(75) Inventors: William V. Dower, Austin, TX (US);
Kenneth D. Rebers, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 394 days.

This patent is subject to a terminal disclaimer.

(21) Appl. No.: 11/422,680

(22) Filed: Jun. 7, 2006

(65) Prior Publication Data
US 2008/0000684 A1 Jan. 3, 2008

(51) Int. Cl.
H02G 15/08 (2006.01)

(52) U.S. Cl. ....................................... 174/93
(58) Field of Classification Search ................ 174/92, 174/93
See application file for complete search history.

(56) References Cited

U.S. PATENT DOCUMENTS

| 3,515,798 | A | 6/1970 | Sievert |
| 3,545,773 | A | 12/1970 | Smith et al. |
| 3,676,387 | A | 7/1972 | Lindlof |
| 3,678,174 | A | 7/1972 | Ganzhom |
| 3,827,999 | A | 8/1974 | Crossland |
| 3,935,373 | A | 1/1976 | Smith et al. |
| 3,992,569 | A | 11/1976 | Hankins et al. |
| 4,256,920 | A | 3/1981 | Ayres et al. |
| 4,308,416 | A | 12/1981 | Herman et al. |
| 4,343,844 | A | 8/1982 | Thayer et al. |
| 4,464,425 | A | 8/1984 | Voigt et al. |
| 4,504,699 | A | 3/1985 | Dones et al. |
| 4,550,056 | A | 10/1985 | Pickwell et al. |
| 4,569,868 | A | 2/1986 | De Blauwe et al. |
| 4,742,184 | A | 5/1988 | Courty et al. |
| 4,798,853 | A | 1/1989 | Handlin, Jr. |
| 4,849,580 | A | 7/1989 | Reuter |
| 4,857,563 | A | 8/1989 | Croft et al. |
| 4,859,809 | A | 8/1989 | Jervis |
| 4,877,943 | A | 10/1989 | Oiwa |
| 4,879,436 | A | 11/1989 | Braham |

(Continued)

FOREIGN PATENT DOCUMENTS

DE 1813201 7/1970

(Continued)

OTHER PUBLICATIONS

Product Literature: "Black-Jack™ and 50-Pair Cable Closures with Water-Block Sealing System for Direct Buried Spliced Cables," Preformed Line Products (PLP), (2000), 2 pages.

(Continued)

Primary Examiner—Chau N Nguyen
(74) Attorney, Agent, or Firm—Gregg H. Rosenblatt

(57) ABSTRACT

A concave housing is provided having an open face and having several circumferential perimeter portions adjacent the open face of the housing. An elastomeric film can be mounted on the circumferential perimeter portions of the concave housing across the open face of the concave housing. The elastomeric film can be adapted to interface one or more cables when the cables are positioned within the housing to seal the cables from environmental conditions.

18 Claims, 3 Drawing Sheets

U.S. PATENT DOCUMENTS

| | | |
|---|---|---|
| 4,902,855 A | 2/1990 | Smith |
| 4,915,990 A | 4/1990 | Chang |
| 4,942,270 A | 7/1990 | Gamarra |
| 4,943,685 A | 7/1990 | Reynaert |
| 4,990,380 A | 2/1991 | Jensen et al. |
| 5,313,019 A | 5/1994 | Brusselmans et al. |
| 5,439,031 A | 8/1995 | Steele et al. |
| 5,574,257 A | 11/1996 | Brauer et al. |
| 5,574,259 A | 11/1996 | Meltsch et al. |
| 5,606,148 A | 2/1997 | Escherich et al. |
| 5,688,601 A | 11/1997 | Usifer et al. |
| 5,753,861 A | 5/1998 | Hansen et al. |
| 5,883,333 A | 3/1999 | Wambeke et al. |
| 5,912,433 A | 6/1999 | Pulido et al. |
| 6,103,317 A | 8/2000 | Asai et al. |
| 6,103,975 A | 8/2000 | Krabs et al. |
| 6,169,160 B1 | 1/2001 | MacQueen et al. |
| 6,169,250 B1 | 1/2001 | Bolcato |
| 6,248,953 B1 | 6/2001 | Miller |
| 6,284,976 B1 | 9/2001 | Pulido et al. |
| 6,304,698 B1 * | 10/2001 | Morris .................... 385/100 |
| 6,359,226 B1 | 3/2002 | Biddell et al. |
| 6,403,889 B1 | 6/2002 | Mehan et al. |
| 6,407,338 B1 | 6/2002 | Smith |
| 6,730,847 B1 | 5/2004 | Fitzgerald et al. |
| 7,215,865 B2 | 5/2007 | Bellekens et al. |
| 7,307,219 B1 * | 12/2007 | Dower et al. ............ 174/84 R |
| 2004/0065457 A1 | 4/2004 | Hager et al. |
| 2006/0037687 A1 | 2/2006 | Buekers et al. |

FOREIGN PATENT DOCUMENTS

| | | |
|---|---|---|
| EP | 0 530 952 A1 | 3/1993 |
| EP | 0 750 381 A1 | 12/1996 |
| EP | 0 780 949 A1 | 6/1997 |
| JP | 07-298443 | 11/1995 |

OTHER PUBLICATIONS

Product Literature: "Ranger SERVISEAL® Closure, Super SERVISEAL® Closure," *Preformed Line Products* (*PLP*), (2002), 2 pages.

* cited by examiner

SEALING APPARATUS

BACKGROUND

Closure housings have been used in the telecommunications industry and electrical utilities industry for the purpose of protecting cables from outside environmental elements. Such closure housings can be installed above-ground as aerial closures, buried underground, placed in hand-holes, or mounted on poles. The outer perimeter of the closure housing provides mechanical protection from environmental elements such as rains, floods, winds, and snow, and other water or dirt particles that may harm the splice or connector.

SUMMARY

Embodiments of the invention, for example, can advantageously include a concave housing having an open face and having several circumferential perimeter portions adjacent the open face of the housing. An elastomeric film can be mounted on the circumferential perimeter portions of the concave housing across the open face of the concave housing. The elastomeric film can be adapted to interface one or more cables when the cables are positioned within the housing to seal the cables from environmental conditions.

Also, for example, embodiments of the invention can advantageously include a concave housing having an open face and several circumferential perimeter portions adjacent the open face of the housing. An elastomeric film can be mounted on the circumferential perimeter portions of the concave housing across the open face of the concave housing. One or more cables can be positioned within the housing. A first portion of each of the cables can be substantially surrounded by the elastomeric film to seal the cables from environmental conditions. A second portion of each of the cables can extend outside of the elastomeric film and the concave housing.

In operation, the invention advantageously provides improved protection and watertight sealing of one or more cables and/or joining components from harmful environmental conditions in the communications industry (such as telecommunications industry), utilities industry (such as electrical utilities industry), or other industries involving the distribution of cables and/or the transmission of optical light or electricity, seeking improved solutions regarding sealing solutions, re-enterability solutions, pressure condition solutions, space condition solutions, and weight condition solutions advantageously provided by the invention.

In one aspect of the invention, the inclusion of the elastomeric film, flexible layer, and/or conformable sealant, in combination with the hollow nature of the concave housing, advantageously provides a solution for a closure housing that offers improved sealing, while at the same time providing a closure housing that is re-enterable to an extent not provided in existing closure housings.

Further, in another aspect, the invention advantageously provides improved mechanical cable stress and strain relief based on pressure changes during periods of operation. The relatively soft surface of the layers mounted to the housings can deform to accommodate pressure changes, without placing undue stress on the outer perimeter of the housings. The compliance of the deformable layers mounted to the housings allows for significant changes in the shape of the closure while maintaining a watertight seal. Because the volume protected from water is only marginally larger than the volume of the splice, and generally vastly smaller than the entire volume of the interior of the closure housing, the influence of pressure changes due to immersion are advantageously minimized, as compared to rendering the entire volume of the closure housing watertight.

Further, the hollow nature of the concave housing advantageously provides increased room or space for the displacement of large cables inside the closure housing. Further, the hollow nature of the concave housing advantageously provides a lightweight solution for a closure housing, and the decrease in weight importantly allows for easier installation and transport, as well as a reduction in cost associated with the manufacture of such a closure housing.

In the past, closure housings have demonstrated problems that have not as yet been overcome in the art. Prior closure housings, and the sealing mechanism thereof, have demonstrated significant changes in shape with changing temperatures. Such changes in shape have caused loss of the seal and failure of the water and dirt particle barrier properties important to the sealing function. Prior closure housings also have presented the problem of not being easily re-enterable, which is significant in cases where cable repair or splice repair is necessary. The excess materials and heavier weight associated with prior closure housings contributed to increased waste and more difficult transport.

DETAILED DESCRIPTION

Figure 1A:
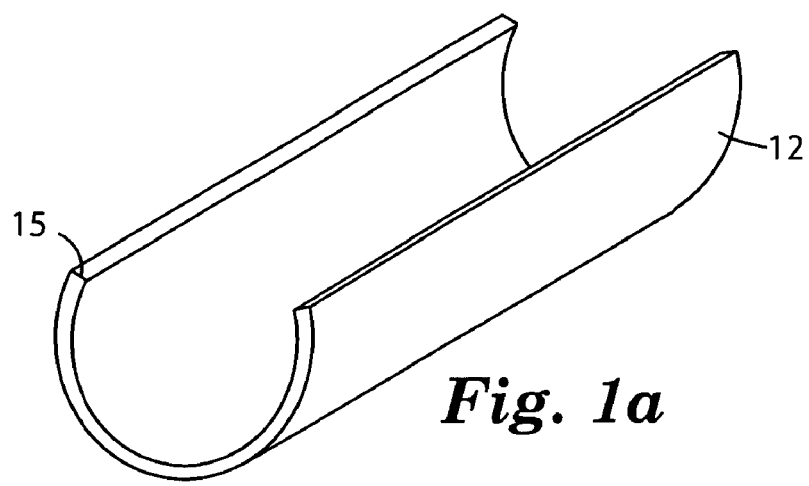
FIG. 1a is an isometric view of a concave housing according to an embodiment of the invention.
Figure 1B:
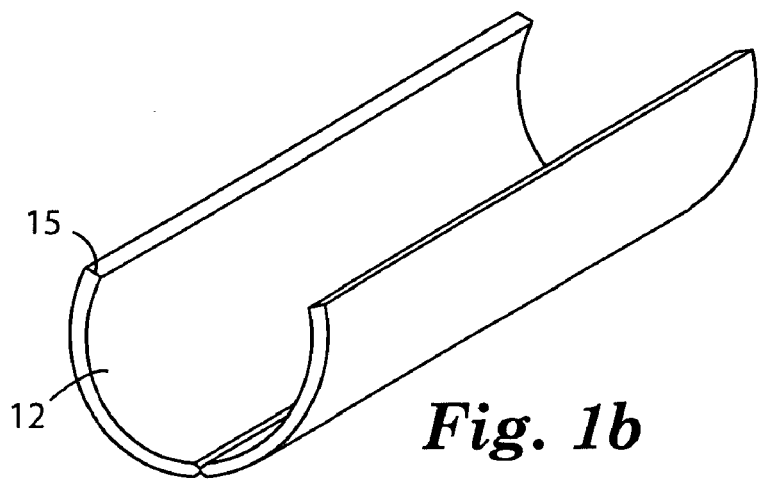
FIG. 1b is an isometric view of a concave housing according to another embodiment of the invention.

As shown in the Figures, the invention includes a concave housing 12 having an open face. As shown in FIG. 1a, embodiments of the invention can include, for example, a single flexible material capable of bending. Also, for example, as shown in FIG. 1b, embodiments can include several rigid arcuate walls joined by hinges which collectively form the concave housing.

The housing 12 can be made by various processes, for example, injection molding, blow molding, spin molding, extrusion molding, vacuum molding, rotational molding, and thermal forming. Embodiments of the housing 12 can be made from various materials, for example, aluminum, steel, metal alloys, and plastics, particularly injection molded thermoplastics, such as polyolefins, polyamides, polycarbonates, polyesters, polyvinyls, and other polymeric materials. The plastic housing 12 embodiments can use a metal reinforcing strip for increased stability and strength.

The housing 12 can be hollow and concave. The concave housing 12 can include a large concavity or a small concavity, and can include, for example, a concavity such as within a hollow rectangular box having an open face, or a concavity such as within a hollow semi-cylindrical structure having an open face. The closure can include, for example, embodiments where the volume between an inside wall of the concave housing 12 and the elastomeric film 20 is substantially free of filler material. Also, the closure can include embodiments where a portion of the wall of the concave housing 12 comprises one or more orifices 72, to let air penetrate within the volume inside the concave housing 12.

Alternatively, the closure can include embodiments, for example, where compressible gas bladders 70 are positioned in the concave cavity of the concave housing 12. Also, the closure can include embodiments where rupturable gas bladders 70 are positioned in the concave cavity of the concave housing 12. The material used to make gas bladders 70 is usually polyethylene. The diameter, height, and pressure of the gas bladders 70 may vary. The gas bladders 70, for example, can be "bubble wrap." The gas bladders 70, for example, can include nitrogen filled bladders. The gas bladders 70 advantageously apply a relatively consistent pressure to the cables 30 and/or joining component 35 inside the closure housing 10. Also, embodiments of the gas bladders 70 can be pre-assembled with a film on the top and/or bottom of the gas bladder 70.

As shown in the Figures, embodiments of the housing 12 can include, for example, one or more elastomeric films 20 mounted on a circumferential perimeter 15 portion of the concave housing 12 across the open face of each of the concave housing 12.

Figure 2A:
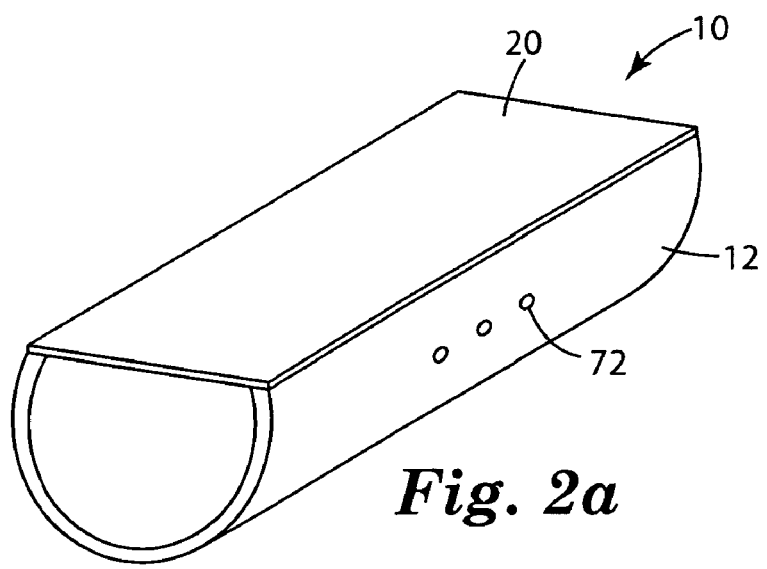
FIG. 2a is an isometric view of an elastomeric film mounted on a housing according to an embodiment of the invention.
Figure 2B:
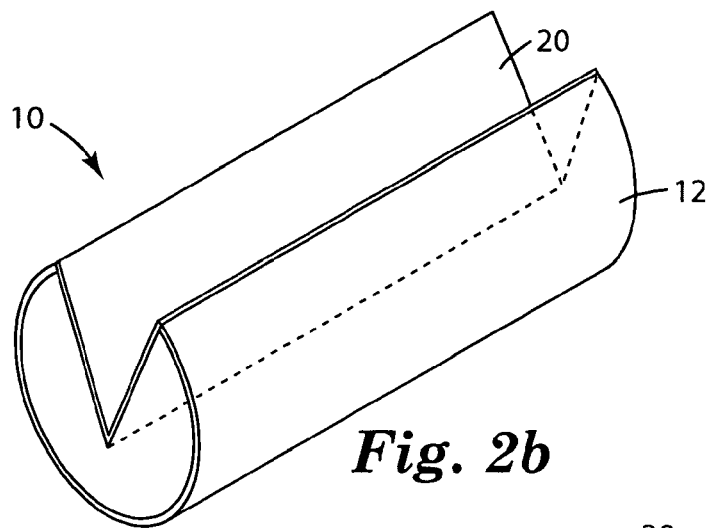
FIG. 2b is an isometric view of an elastomeric film mounted on a housing according to an embodiment of the invention.

For example, as shown in FIGS. 2a and 2b, the elastomeric film 20 can be mounted to the housing 12 by aligning one or more elastomeric films 20 to one or more of the concave housing 12 in a substantially planar configuration across a circumferential perimeter 15 of the open face of each concave housing 12, and securing the elastomeric films 20 on the concave housing 12. The circumferential perimeter portions 15 of the open face of the housing 12 are configured parallel to an axial axis of the housing 12. As shown in FIG. 2a, embodiments can include the elastomeric film 20 mounted flat across the open face of the housing 12. Alternatively, as shown in FIG. 2b, embodiments can include the elastomeric film 20 in a curved configuration and attached to the circumferential perimeter of the housing 12 to facilitate insertion of one or more cables 30.

The elastomeric film 20 typically includes at least a polymer and an oil portion. Embodiments of the elastomeric film 20 can include, for example, a polymeric thermoplastic hydrophobic gel sealant including at least a portion of oil.

The properties of the polymer which make it most suited for this application are good compatibility with the oil, and rubber-like morphology, meaning flexible chains with some significant molecular flexibility between cross-linking sites. Examples of polymers that are useful can include oil-filled silicones, polyurethanes, polyesters, polyepoxys, polyacrylates, polyolefins, polysiloxanes, polybutadienes (including polyisoprenes), and hydrogenated polybutadienes and polyisoprenes, as well as copolymers, including block copolymers and graft copolymers. The blocks of the block copolymers may include the above polymers and poly (monoalkenylarenes) including polystyrene. Examples of these bock copolymers can include particularly SEBS (Styrene, ethylene-butylene, Styrene), SEPS (Styrene, ethylene-propylene, Styrene), similar Styrene-rubber-Styrene polymers, di-block, tri-block, graft- and star-block copolymers, and block copolymers with blocks which are non-homogeneous. Closed-cell foamed materials, and those incorporating microbubbles or other soft (or hard) fillers can also be included.

Embodiments can feature the elastomeric film 20 as a thermoplastic or alternatively as being cured in place. In the form of thermal cures, room temperature vulcanizable cures (RTV cures), UV-initiated cures, e-beam cures, radiation initiated cures, and cures from exposure to air and/or moisture. The elastomeric film 20 typically has greater cohesion than adhesion.

The portion of oil in the elastomeric film 20 can be, for example, in the range of about 50% to about 98% of the elastomeric film 20, or more particularly, in the range of about 85% to about 98% of the elastomeric film 20. Also, for example, embodiments of the elastomeric film 20 can include filler particles, such as polymeric spheres or glass microspheres. One example of such filler particles is deformable bubbles, where the elastomeric film 20 is formed by foaming and adding discrete bubbles. The added bubbles can be polymeric or glass microbubbles. Addition of such filler particles or bubbles allows the elastomeric film 20 to demonstrate volume compliance which will further allow conformity of the elastomeric film 20 in operation.

Embodiments of the oil can include, for example, an extender such as synthetic oils, vegetable oils, silicones, esters, hydrocarbon oils, including particularly naphthinic oils and paraffinic oils and blends, and also possibly some small percentage of aromatic oils. Some compositions within the elastomeric film 20 are intermediate between the polymer and the oil. For example, the elastomeric film 20 can include a liquid rubber which may not become part of the gel-forming polymer network. Examples of such a liquid rubber can include polybutene of moderate molecular weight, and low molecular weight EPR (Ethylene Propylene Rubber). Adding a liquid rubber to the polymer and oil can tailor the characteristics of the sealant by increasing the tack, for example. Takifiers, antioxidants, colorants, UV stabilizers, and others can be added.

Typically, the oil is advantageously hydrophobic to keep water out. Also, typically, the oil advantageously reduces the amount of chain entanglements and the number of crosslinks per volume, thereby making the material softer in the gel form. Also, typically, the oil advantageously reduces the viscosity of either the precursor (before curing) or the melted thermoplastic. Also, typically, the oil is relatively inexpensive thereby reducing the cost of the total formulation.

Figure 3A:
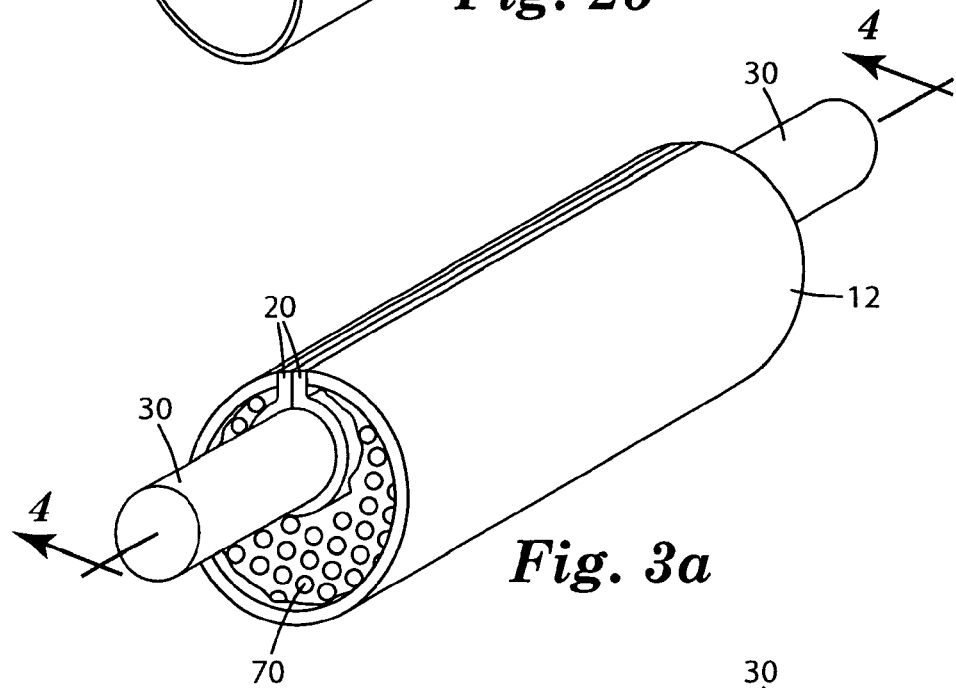
FIG. 3a is an isometric view of a closure housing including one or more cables according to an embodiment of the invention.
Figure 3B:
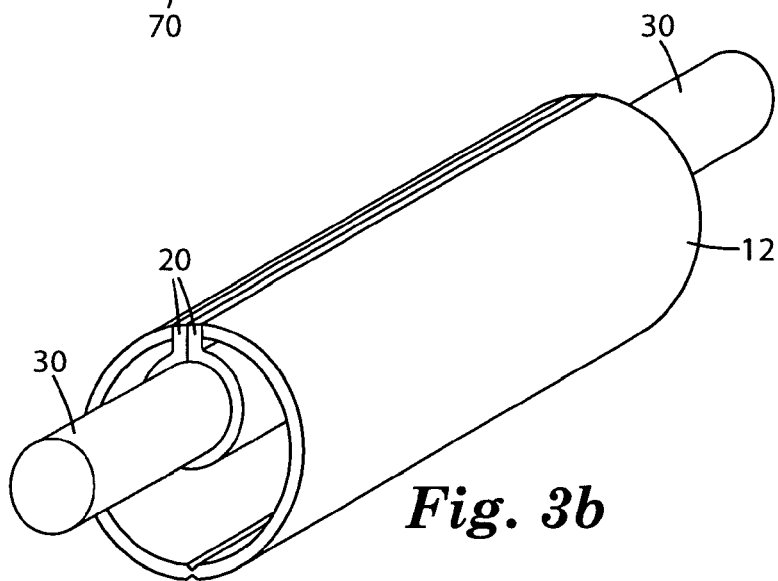
FIG. 3b is an isometric view of a closure housing including one or more cables according to an embodiment of the invention.
Figure 5:
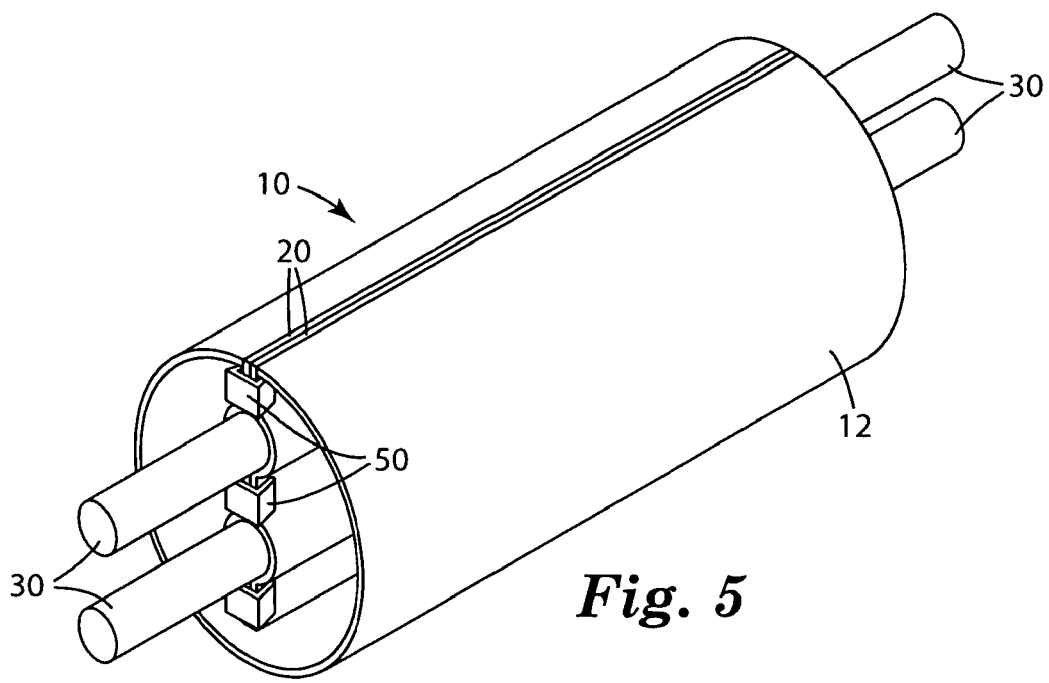
FIG. 5 is an isometric view of a closure housing including more than one cable according to an embodiment of the invention.

As shown in FIGS. 3 and 5, the housing 12 can be used to seal water or other environmental elements from cables 30 and/or joining components 35 inside the closure housing 10. FIG. 3a shows the housing as a single flexible structure which includes gas bladders 70 between the housing 12 and the elastomeric film 20. FIG. 3b shows the housing as several hinged rigid walls that are form a hollow housing 12 around the elastomeric film 20 and the cables 30. FIG. 5 shows multiple cables 30 entering and exiting each side of the housing 12.

A first portion of each of the cables 30, for example, can be placed in the housing 12 to be substantially surrounded by the elastomeric film 20. A second portion of each of the cables 30, for example, can extend outside of the housing 12 and the elastomeric film 20 mounted to the housing 12. Embodiments of the cable 30 can include, for example, a copper or aluminum wire cable 30, a preterminated cable 30, a glass optical fiber cable 30, a polymer optical fiber cable 30, a hybrid wire and fiber optic cable 30, or any other type of cable 30 that conducts light and/or electricity.

The housing 12 can advantageously operate to seal a single cable 30 or a series of cables 30 from water or other environmental elements. Embodiments can include, for example, a cable 30 or series of cables 30 joined to another cable 30 or series of cables 30 within the closure via a joining component 35, or a single cable 30 run all the way through the closure as a single unit, or, for example, both can occur within a single closure. Each of the cables 30 passing inside or through the closure is configured along a direction substantially parallel to the plane of the open face of the concave housing 12. The circumferential perimeter portions are joined by one or more fasteners at opposite sides of the open face to retain the closure housing 10 in the closed or shut position with the cables 30 sealed therein. One type of fastener, for example, can be integral to the housing after extrusion molding.

Figure 4A:
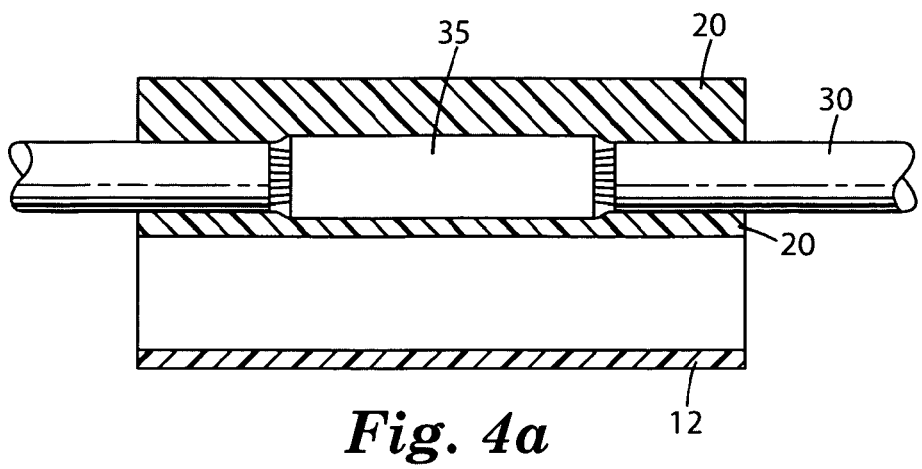
FIG. 4A is a sectional view of a closure housing taken along the line 4-4 of FIG. 3 according to an embodiment of the invention and FIG. 4B is another sectional view of a closure housing taken along the line 4-4 of FIG. 3 where the cable includes a cable repair material.
Figure 4B:
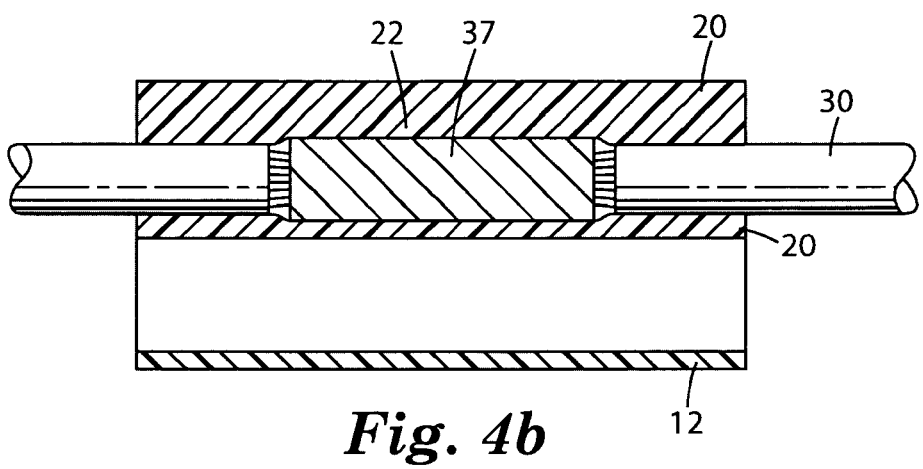

In some embodiments that do not include a joining component 35 joining two or more cables 30, a single cable 30 running through the closure may need to be sealed from water or other environmental elements after a cable repair material 37 is applied for repair or maintenance of the cable 30 (as shown in FIG. 4B). In such a case where a cable repair material surrounds one or more cables 30 within the closure, the worn or torn portion of the cable 30 that contains the cable repair material interfaces a portion 22 of at least one of the elastomeric films 20, for example, after being placed in the housing 12 of the closure. Embodiments of the cable repair material applied to the cable 30 can include, for example, tapes, mastics, foams, epoxys, encapsulants, shield bond connectors, braid, #6 ground wire, and other types of cable repair materials.

If a joining component 35 is used to join two or more cables 30, the housing 12 advantageously operates to seal not only each cable 30 run inside or through the closure, but also to seal the joining component 35 inside the closure from water or other environmental elements. Embodiments of the joining component 35 can include, for example, a splice or other joining component 35 having connectors therein (including discrete connectors, modular connectors, tap connectors, pre-terminated connector, or other connectors). Also, for example, in some applications the joining component 35 can include a termination, where the cable 30 is joined with a terminal piece of electrical or fiber optic equipment.

As shown in FIG. 4, the joining component 35, when surrounded by the elastomeric film 20, interfaces a portion of the elastomeric film 20 mounted to the housing 12. The elastomeric film 20 advantageously operates to prevent external particles and fluids from accessing the portion of the one or more cables 30 and/or joining components 35 interposed elastomeric film 20.

In some embodiments, as shown in FIG. 5, if more than one cable 30 is desired to enter the closure housing on either side, and if the several cables 30 are too close together, or of too large a diameter, then there may be a small space which exists between the cables 30 of which the elastomeric film 20 does not fill the volume. In such a case, a clip, clamp, or other fastener 50 or series of clips, clamps, or fasteners 50 can be used to clamp the facing layers of elastomeric film 20 to each other at the portion between the cables 30, thereby closing the volume of space between the cables 30 and sealing the cables 30 from water, dirt, particles, or other environmental conditions.

As shown in the exemplary embodiment of FIG. 4, a volume of space can exist between the elastomeric film 20 surrounding one side of the cable 30 and the other side of the cable 30 (between the cable and the joining component), whereby the volume of space is advantageously compliant to changes in air pressure. The space can advantageously allow the volume of the space to be compressed responsive to increases of the external pressure of the volume inside the concave housing 12 outside the elastomeric film 20.

In operation, the invention advantageously provides improved protection and watertight sealing of one or more cables 30 and/or joining components 35 from harmful environmental conditions in the communications industry (such as telecommunications industry), utilities industry (such as electrical utilities industry), or other industry involving the distribution of cables 30 and/or the transmission of optical light or electricity, seeking improved solutions regarding sealing solutions, re-enterability solutions, pressure condition solutions, space condition solutions, and weight condition solutions advantageously provided by the invention.

The inclusion of the elastomeric film 20, in combination with the hollow nature of the concave housing 12, advantageously provides a solution for a closure housing 10 that offers exceptional sealing, while at the same time providing a closure housing 10 that is re-enterable to an extent not provided in previous closure housings 10.

Further, the invention advantageously provides improved mechanical cable 30 stress and strain relief based on inevitable pressure changes during periods of operation. The relatively soft surface of the elastomeric film 20 mounted to the housing 12 can deform to accommodate pressure changes, without putting undue stress on the outer perimeter of the housing 12. The compliance of the deformable layers mounted to the housing 12 allows for significant changes in the shape of the closure while maintaining a watertight seal. Because the volume protected from water is only marginally larger than the volume of the splice, and generally significantly smaller than the entire volume of the interior of the closure housing 10, the influence of pressure changes due to immersion are advantageously minimized, as compared to rendering the entire volume of the closure housing 10 watertight.

Further, the hollow nature of the concave housing 12 advantageously provides increased room or space for the displacement of large cables 30 inside the closure housing 10. Further, the hollow nature of the concave housing 12 advantageously provides a lighter solution for a closure housing 10, and the decrease in weight importantly allows for easier installation and transport, as well as a reduction in cost associated with the manufacture of such a closure housing 10.

Although the aforementioned detailed description contains many specific details for purposes of illustration, anyone of ordinary skill in the art will appreciate that many variations, changes, substitutions, and alterations to the details are within the scope of the invention as claimed. Accordingly, the invention described in the detailed description is set forth without imposing any limitations on the claimed invention. The proper scope of the invention should be determined by the following claims and their appropriate legal equivalents.

That claimed is:

1. An apparatus comprising:
  a concave housing having an open face, the concave housing having a plurality of circumferential perimeter portions adjacent the open face of the housing; and
  an elastomeric film mounted on the circumferential perimeter portions of the concave housing across the open face of the concave housing, wherein the elastomeric film is adapted to interface one or more cables when the one or more cables are positioned within the housing to seal the one or more cables from environmental conditions, wherein the elastomeric film comprises a polymeric hydrophobic composition including at least a portion of oil.

2. The apparatus as defined in claim 1, wherein the concave housing comprises a flexible material.

3. The apparatus as defined in claim 1, wherein the concave housing comprises a plurality of rigid arcuate walls joined by hinges.

4. The apparatus as defined in claim 1, wherein the volume between an inside wall of the concave housing and the elastomeric film is substantially free of filler material.

5. The apparatus as defined in claim 1, wherein the circumferential perimeter portions of the open face of the concave housing are configured parallel to an axial axis of the concave housing.

6. The apparatus as defined in claim 1, wherein at least a portion of the elastomeric film comprises a polymeric thermoplastic hydrophobic composition including at least a portion of oil.

7. The apparatus as defined in claim 6, wherein the portion of oil comprises about 50% to about 98% of the elastomeric film.

8. The apparatus as defined in claim 1, wherein at least a portion of the elastomeric film includes filler materials.

9. The apparatus as defined in claim 1, wherein at least a portion of the elastomeric film comprises an oil and a polymer selected from the group consisting of: a polyurethane, a polyester, a polystyrene, a polyepoxy, a polyacrylate, and a polyolefin.

10. The apparatus as defined in claim 1, wherein at least a portion of the elastomeric film comprises a copolymer of which at least a portion is selected from the group consisting of: a polyurethane, a polyester, a polystyrene, an epoxy, an acrylate, and a polyolefin.

11. The apparatus as defined in claim 1, wherein a first portion of each of the one or more cables is substantially surrounded by the elastomeric film, and wherein a second portion of each of the one or more cables extends outside of the elastomeric film and the concave housing.

12. The apparatus as defined in claim 11, wherein each of the cables is configured along a direction substantially parallel to the plane of the open face of the concave housing.

13. The apparatus as defined in claim 11, wherein the one or more cables comprises two or more cables; and
further comprising a joining component that joins the two or more cables, wherein a portion of the joining component interfaces a portion of the elastomeric film.

14. The apparatus as defined in claim 11, further comprising a cable repair material surrounding the one or more cables, wherein a portion of the cable repair material interfaces a portion of the elastomeric film.

15. The apparatus as defined in claim 11, further comprising a volume of space encased within the inner diameter of a portion of the elastomeric film, the volume of space being compliant to changes in air pressure.

16. The apparatus as defined in claim 11, wherein a portion of the wall of the concave housing comprises one or more orifices.

17. The apparatus as defined in claim 11, further comprising one or more gas bladders positioned in a concave cavity of the concave housing.

18. An apparatus comprising:
a concave housing having an open face, the concave housing having a plurality of circumferential perimeter portions adjacent the open face of the housing;
an elastomeric film mounted on the circumferential perimeter portions of the concave housing across the open face of the concave housing, wherein the elastomeric film comprises a polymeric hydrophobic composition including at least a portion of oil; and
one or more cables, a first portion of each of the one or more cables substantially surrounded by the elastomeric film to seal the one or more cables from environmental conditions, and a second portion of each of the one or more cables extending outside of the elastomeric film and the concave housing.

* * * * *